(12) United States Patent
Ostergren et al.

(10) Patent No.: US 8,262,472 B2
(45) Date of Patent: Sep. 11, 2012

(54) COMPREHENSIVE SINGLE PAGE VIEW OF USER'S GAMING ACHIEVEMENTS

(75) Inventors: Brian Ostergren, Redmond, WA (US); Trisha Eileen Stouffer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1344 days.

(21) Appl. No.: 11/859,194

(22) Filed: Sep. 21, 2007

(65) Prior Publication Data

US 2009/0082101 A1    Mar. 26, 2009

(51) Int. Cl.
*A63F 9/24* (2006.01)
(52) U.S. Cl. ............................................ 463/30; 463/31
(58) Field of Classification Search .................... 463/30, 463/31
See application file for complete search history.

(56) References Cited

U.S. PATENT DOCUMENTS

| | | | |
|---|---|---|---|
| 5,222,236 A | 6/1993 | Potash et al. | |
| 5,846,132 A | 12/1998 | Junkin | |
| 6,224,485 B1 | 5/2001 | Dickinson et al. | |
| 6,699,125 B2 | 3/2004 | Kirmse et al. | |
| 6,852,033 B2 | 2/2005 | Kinjo et al. | |
| 6,881,148 B2 | 4/2005 | Yotsugi et al. | |
| 7,056,217 B1 | 6/2006 | Pelkey et al. | |
| 7,090,577 B2 | 8/2006 | Serizawa et al. | |
| 7,240,093 B1 | 7/2007 | Danieli et al. | |
| 7,311,608 B1 | 12/2007 | Danieli et al. | |
| 7,441,151 B2 * | 10/2008 | Whitten et al. ................. | 714/15 |
| 2002/0160838 A1 | 10/2002 | Kim | |
| 2003/0204566 A1 | 10/2003 | Dhupelia et al. | |
| 2003/0233537 A1 | 12/2003 | Wohlgemuth et al. | |
| 2004/0162144 A1 | 8/2004 | Loose et al. | |
| 2004/0192440 A1 | 9/2004 | Evans et al. | |
| 2004/0220850 A1 | 11/2004 | Ferrer et al. | |
| 2005/0004840 A1 | 1/2005 | Wanninger | |
| 2005/0070359 A1 | 3/2005 | Rodriquez et al. | |
| 2005/0091108 A1 | 4/2005 | Frost | |
| 2005/0096982 A1 | 5/2005 | Morton et al. | |
| 2005/0114526 A1 | 5/2005 | Aoyama | |
| 2005/0209002 A1 | 9/2005 | Blythe et al. | |
| 2005/0239550 A1 | 10/2005 | Hardisty et al. | |
| 2005/0282628 A1 | 12/2005 | Beatty et al. | |
| 2006/0003841 A1 | 1/2006 | Kobayashi et al. | |
| 2006/0121973 A1 | 6/2006 | Parisien | |

(Continued)

FOREIGN PATENT DOCUMENTS

EP          1052588 A3     5/2002

(Continued)

OTHER PUBLICATIONS

Monsarrat, "Adapting Massively Multiplayer Internet Computer Games to the Mainstream Market: A Business Plan for Turbine Entertainment Software," May 18, 2000 http://dspace.mit.edu/bitstream/1721.1/32707/1/49340604.pdf.

(Continued)

*Primary Examiner* — Pierre E Elisca
(74) *Attorney, Agent, or Firm* — Vierra Magen Marcus & DeNiro LLP

(57) ABSTRACT

A method is disclosed for providing comprehensive information of all game achievements on a single GUI of a gaming and media system. The achievements GUI lists all game achievements, whether locked or unlocked, and may visually differentiate between locked and unlocked achievements. Upon a user selecting a listed achievement, information relating to that achievement may be displayed on the same GUI, in an achievement descriptor area beside the area listing the achievements.

11 Claims, 7 Drawing Sheets

U.S. PATENT DOCUMENTS

| | | | |
|---|---|---|---|
| 2006/0121986 | A1 | 6/2006 | Pelkey et al. |
| 2006/0121992 | A1 | 6/2006 | Bortnik et al. |
| 2006/0122716 | A1 | 6/2006 | Bortnik et al. |
| 2006/0258460 | A1 | 11/2006 | Crawford et al. |
| 2006/0287099 | A1 | 12/2006 | Shaw et al. |
| 2007/0005704 | A1 | 1/2007 | Heron et al. |
| 2007/0060317 | A1 | 3/2007 | Martin |
| 2007/0060368 | A1 | 3/2007 | Cheng |
| 2007/0117635 | A1 | 5/2007 | Spanton et al. |
| 2007/0173325 | A1 | 7/2007 | Shaw et al. |
| 2007/0191101 | A1 | 8/2007 | Coliz et al. |
| 2008/0039209 | A1* | 2/2008 | Chen et al. ............ 463/42 |
| 2009/0111576 | A1 | 4/2009 | Ostergren et al. |
| 2009/0111581 | A1 | 4/2009 | Ostergren et al. |
| 2009/0239666 | A1* | 9/2009 | Hall et al. ............ 463/42 |
| 2011/0312398 | A1* | 12/2011 | Ziegler et al. ........... 463/9 |
| 2012/0011189 | A1* | 1/2012 | Werner et al. .......... 709/202 |

FOREIGN PATENT DOCUMENTS

| | | |
|---|---|---|
| WO | 0101307 A2 | 1/2001 |

OTHER PUBLICATIONS

Christoph et al., "PunkBuster for Players," May 18, 2004 http://www.evenbalance.com/publications/aa-pl/.

Inklink, Atom Entertainment, Inc., 2007, <retrieved from Internet Jul. 4, 2007> http://www.shockwave.com/gamelanding/inklink.jsp.

Subramani et al., Knowledge-Sharing and Influence in Online Social Networks via Viral Marketing, Communications of the ACM, Dec. 2003/vol. 46, No. 12ve, pp. 300-307, http://delivery.acm.org/10.1145/960000/953514/p300-subramani.pdf?key1=953514&key2=6249543811&coll=GUIDE&dl=GUIDE&CFID=17286036&CFTOKEN=40030580.

Microsoft Corporation, Xbox 360, Complete Dashboard Update Feature List, Nov. 2006 http://en.wikipedia.org/wiki/Xbox_Live_Arcade.

Office Action dated Feb. 16, 2011, U.S. Appl. No. 11/925,057.

International Search Report and Written Opinion dated Jul. 15, 2009, Application No. PCT/US2008/080597.

Response to Office Action filed May 31, 2011, U.S. Appl. No. 11/925,057.

Final Office Action dated Jun. 10, 2011, U.S. Appl. No. 11/925,057.

Achievements: Your Gaming Legacy, Microsoft Corporation, 2007 http://www.xbox.com/en-US/games/tips/achievements.htm.

Dashboard Enhancements, Design and Content, 2005-2007 Ronald Heft, Jr. http://cavemonkey50.com/2007/05/xbox-360-update-review/.

PlayStation Home Combines the Best of Nintendo's Miis, A Few Xbox 360 Achievements, Second Life, and the Sims, Gizmodo http://gizmodo.com/gadgets/home-entertainment/playstation-home-combines-the-best-of-nintendos-miis-a-few-xbox-360-achievements-second-life-and-the-sims-242148.php.

Playstation3 Home Information Thread, 2007 Sony Computer Entertainment America Inc. http://boardsus.playstation.com/playstation/board/message?board.id=ps3home&thread.id=363.

Office Action dated Jul. 28, 2011, U.S. Appl. No. 11/926,545.

Response to Office Action filed Aug. 26, 2011, U.S. Appl. No. 11/926,545.

Office Action dated Sep. 8, 2011, U.S. Appl. No. 11/926,545.

Response to Final Office Action filed Nov. 10, 2011, U.S. Appl. No. 11/925,057.

Response to Office Action filed Jan. 9, 2012, U.S. Appl. No. 11/926,545.

Notice of Allowance and Fee(s) Due dated Jan. 31, 2012 in U.S. Appl. No. 11/926,545.

Office Action dated May 3, 2012 in Chinese Patent Application No. 200880113481.X.

Response to Office Action dated Jul. 3, 2012 in Chinese Patent Application No. 200880113481.X.

* cited by examiner

COMPREHENSIVE SINGLE PAGE VIEW OF USER'S GAMING ACHIEVEMENTS

BACKGROUND

Gaming systems have evolved from those which provided an isolated gaming experience to networked systems providing a rich, interactive experience which may be shared in real time between friends and other gamers. With Microsoft's Xbox® video game system and Xbox Live® online game service, users can now easily communicate with each other while playing to share the gaming experience. Moreover, when not playing in tandem, current gaming systems allow friends to track others' gaming experiences and accomplishments.

One way in which users track their and their friends' progress through different games is through the concept of game scores and achievements. As gamers progress through a game and complete game-specific challenges, such as getting to a new level or amassing a specified number of wins against other players, the Xbox Live service keeps track of these achievements for Xbox Live service subscribers. Where once a gamer's achievements were only seen by him or her, gamers are now able to see the current progress and achievements of others, either while logged on to the Xbox Live service via an Xbox game console or online. Thus, achievements have become a highly visible measure associated with users, and the keeping and posting of achievement data has evolved into a strong selling point for the Xbox platform and games. Friends and users now compete with each other for the most achievements and new achievements.

Another innovation in current gaming systems is the ability to quickly and easily download games. For example, Microsoft introduced a gaming disc known as Microsoft Arcade which is able to connect to a server through the Internet when the gaming console is connected to the Internet. From the server site, the Arcade gaming disc is able to enumerate full version games which are available for download to the user's hard disc drive on the XBox console. In the past, when a user learned of a game through a friend or otherwise, the user either had to go to a store to purchase the game media, or have the media delivered after an online purchase. With the passage of time and difficulty involved in the purchase, users often lost interest and did not follow through with the purchase. However, platforms such as Microsoft Arcade allow users to obtain games as soon as they learn about them.

While achievement scores have increased interest and sales in gaming platforms, conventional systems have no easy way of providing a comprehensive view of a user's achievements for a particular game. In conventional gaming systems, a user may access achievements through a system graphical user interface (GUI), which then provides a menu system allowing a user to drill down into particular achievements. However, there is no single screen providing a comprehensive view of a user's achievements. A user may access individual achievements, and even when accessing a particular achievement, a user still is required to drill down into successive additional screens to find out all information regarding that achievement. As such, there is room for an improved system which provides a user a comprehensive view of all of the achievement data for a game in a single, easy to use and efficient GUI.

SUMMARY

Embodiments of the present system relate to a method of providing comprehensive information of all game achievements on a single GUI of a gaming and media system. During a game, a user may access an achievements GUI which displays icons for each of the achievements possible within the game. It may be that the user has accomplished some of the achievements in the game and not others. The achievements GUI lists all game achievements, and may visually differentiate achievements which have been accomplished (i.e., unlocked), from those which have not yet been accomplished. In embodiments, the locked achievements may be displayed with a degree of transparency, while the unlocked achievements may be displayed opaquely.

A user may select a particular achievement, locked or unlocked, by placing focus on the achievement via the game controller. Once a user selects an achievement, information relating to that achievement may be displayed on the same GUI, in an achievement descriptor area beside the area listing the achievements. The information displayed within the descriptor area may include a name of the achievement, a score associated with unlocking the achievement, a status of the achievement as either locked or unlocked and a description of the achievement. The description may vary depending on whether the achievement is locked or unlocked.

Thus, according to the present system, a user may see all achievements and receive a description of all achievements on a single, comprehensive screen. Additionally, a user is provided information about all achievements, even those which have not yet been unlocked. A user may also quickly and easily discern on the achievements GUI which achievements have been accomplished and which remain to be accomplished.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
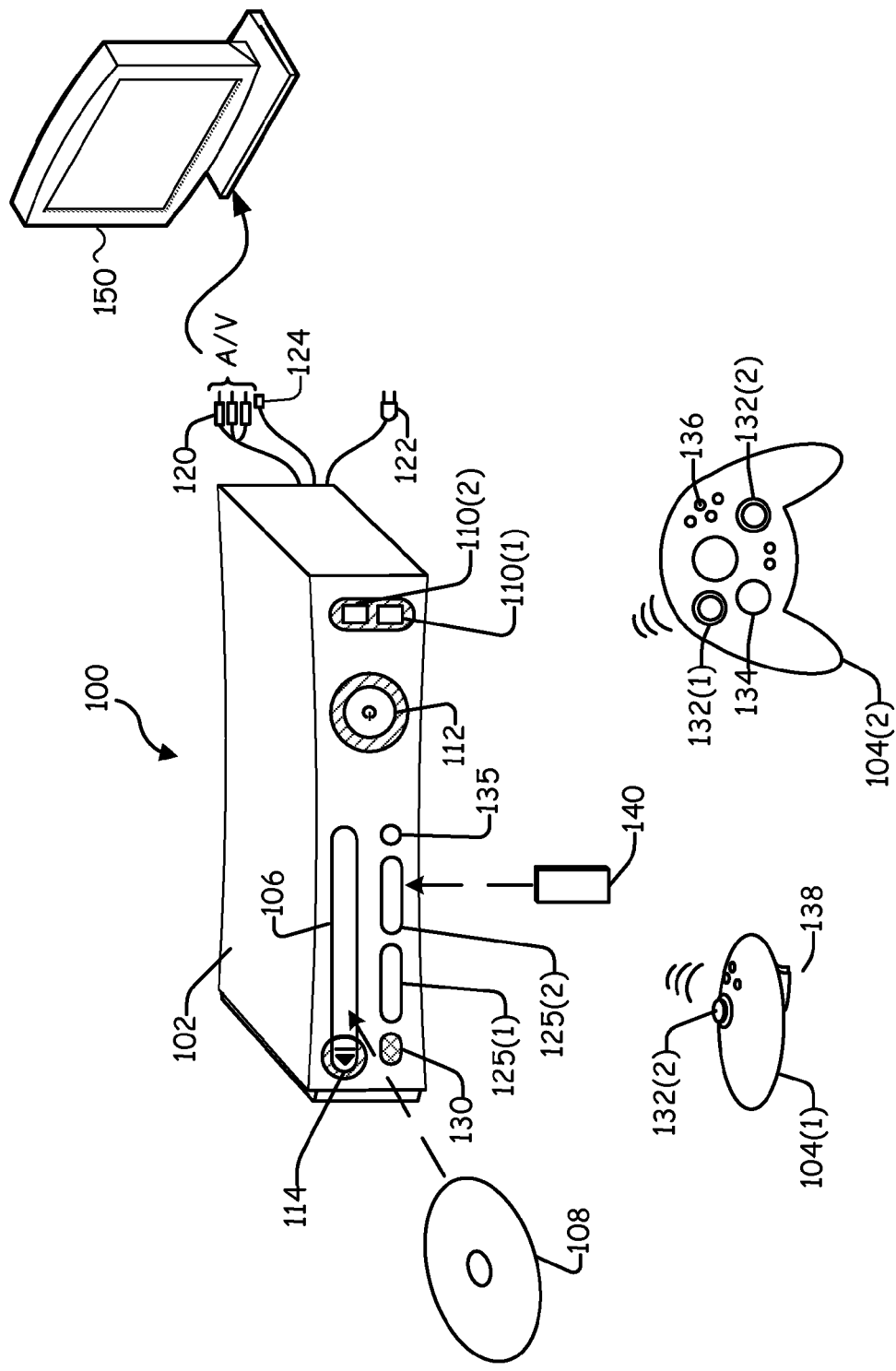
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. A sample of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
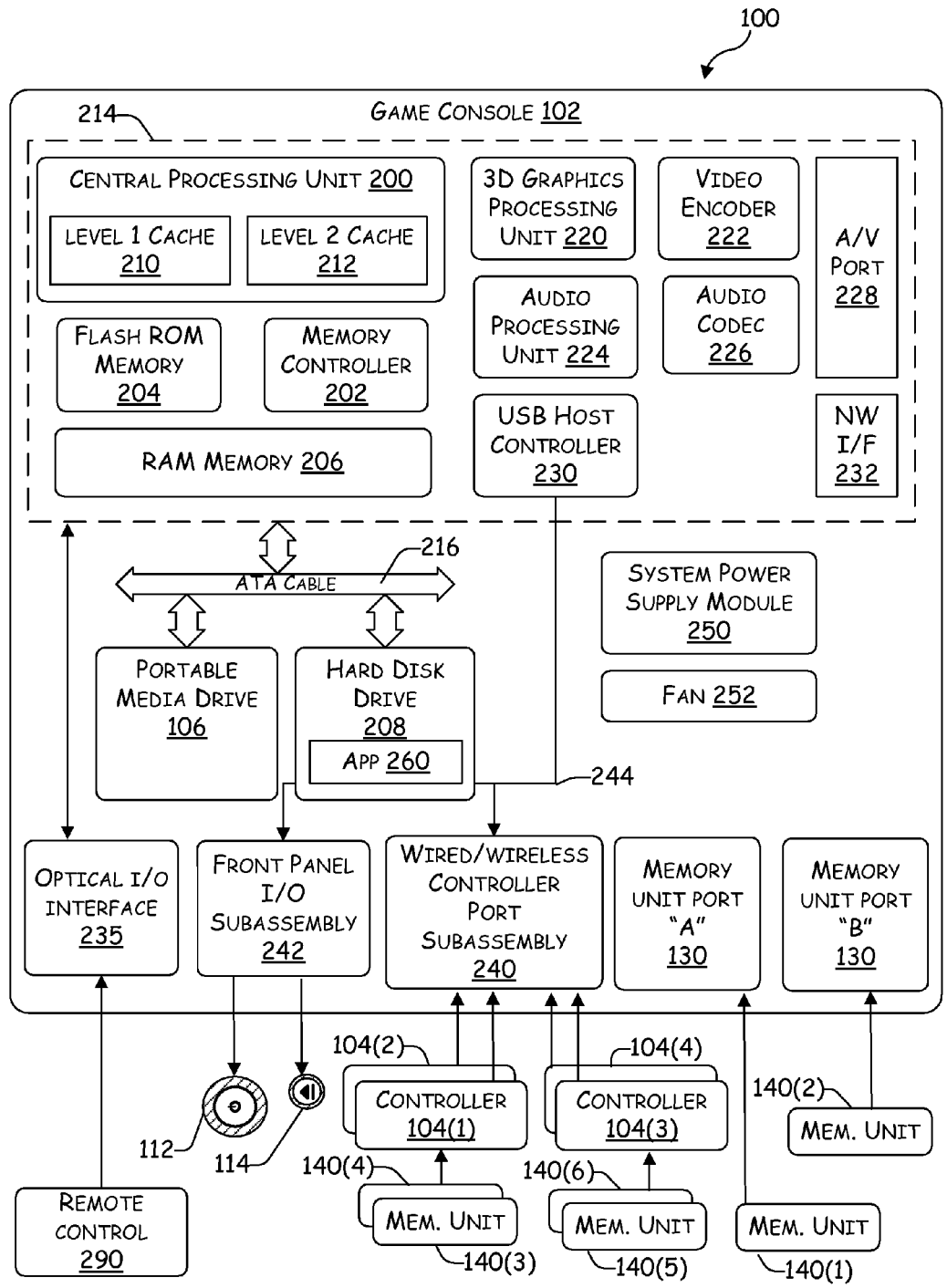
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
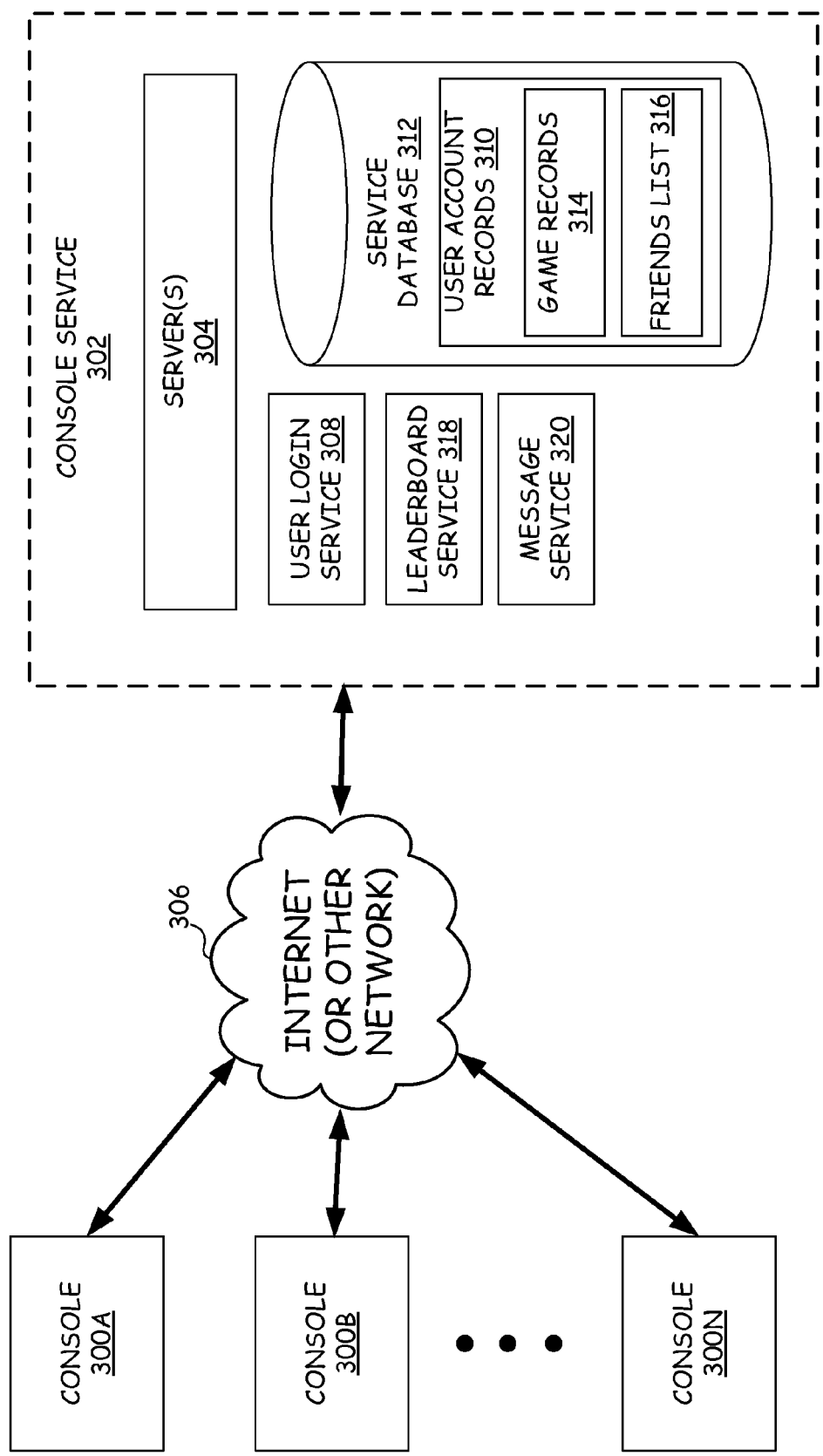
FIG. 3 is a block diagram of an exemplary operating environment for rendering achievement information.

FIG. 3 provides a block diagram of multiple consoles 300A-300N networked with a console service 302 having one or more servers 304 through a network 306. In one embodiment, network 306 comprises the Internet, though other networks such as LAN or WAN are contemplated. Server(s) 304 include a communication component capable of receiving information from and transmitting information to consoles 300A-N and provide a collection of services that applications running on consoles 300A-N may invoke and utilize.

For example, consoles 300A-N may invoke user login service 308, which is used to authenticate a user on consoles 300A-N. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records 314 and friends list 316. Game records 314 include information for a user identified by a gamer tag and can include statistics for a particular game, achievements acquired for a particular game and/or other game specific information as desired.

Friends list 316 includes an indication of friends of a user that are also connected to or otherwise have user account records with console service 302. Friends list 316 can be used to create a sense of community of users of console service 302. Users can select other users to be added to their friends list and view information about their friends such as game performance, current online status, friends list, etc. Friends list 316 can be used to assemble and display achievement information to a user as explained below such that the user can compare the user's score and achievements with those of other users on friends list 316.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include message service 320 which permits one console, such as console 300A, to send a message to another console, such as console 300B. Such messages can include text messages, voice messages, and specialized in text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

Figure 4:
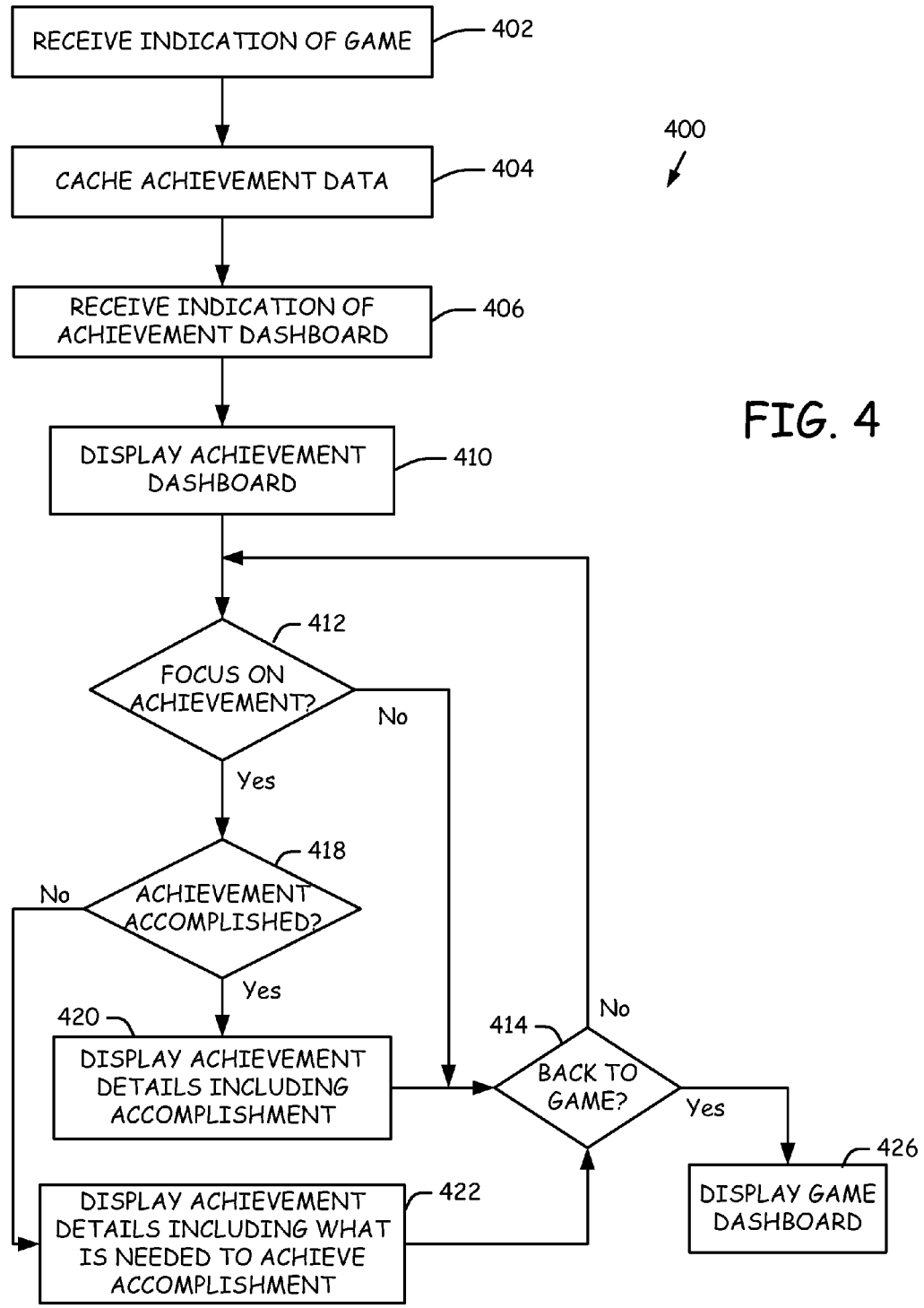
FIG. 4 is a flow diagram of a method for rendering achievement information.

FIG. 4 is a flow diagram of a method 400 for displaying achievement information associated with a user's game on a single, easy to access and easy to use user interface. At step 402, a user provides the operating system of the game console an indication of a game to be played. In one example, this selection can be made by a user by operating controller 104 through a graphical user interface displayed on monitor 150 of FIG. 1. When a highlighted portion of the user interface indicates a particular game, that game can be identified as being selected. Thus, a user of the console can select from a list of games on a user interface instead of inserting a disk or other memory device into the console for game selection.

Once a game is selected, in addition to launching the game, service database 312, discussed above with respect to FIG. 3, is accessed. Once the user is authenticated via user account records 310, the user's game records 314, including in particular all achievements accomplished by the user for that game, are cached in step 404, for example within RAM 206 within the game console 102. Alternatively or additionally, achievement information may be pulled from local memory (permanent or portable) of the user's game console 102.

The caching of all achievement information is an improvement over prior art gaming systems with respect to the treatment of achievements. Given the way achievements were handled and organized in prior art systems, a particular achievement was only downloaded from service 302 when information regarding that particular achievement was accessed by a user. This often resulted in delays, especially on systems making use of slower network connections to console service 302.

In step 406, a user could then opt to view their achievements for the game they are playing. Those of skill in the art will appreciate a wide variety of methods for providing this indication. In one embodiment, a border of the screen in the game GUI may have an option for "View Achievements." The option may alternatively be for a menu which, when selected, has an option for "View Achievements." Alternatively, a button may be provided on controller 104 which, when selected, takes the user to a GUI for Viewing Achievements, or a menu which includes an option for "View Achievements." Other possibilities are contemplated.

Figure 5:
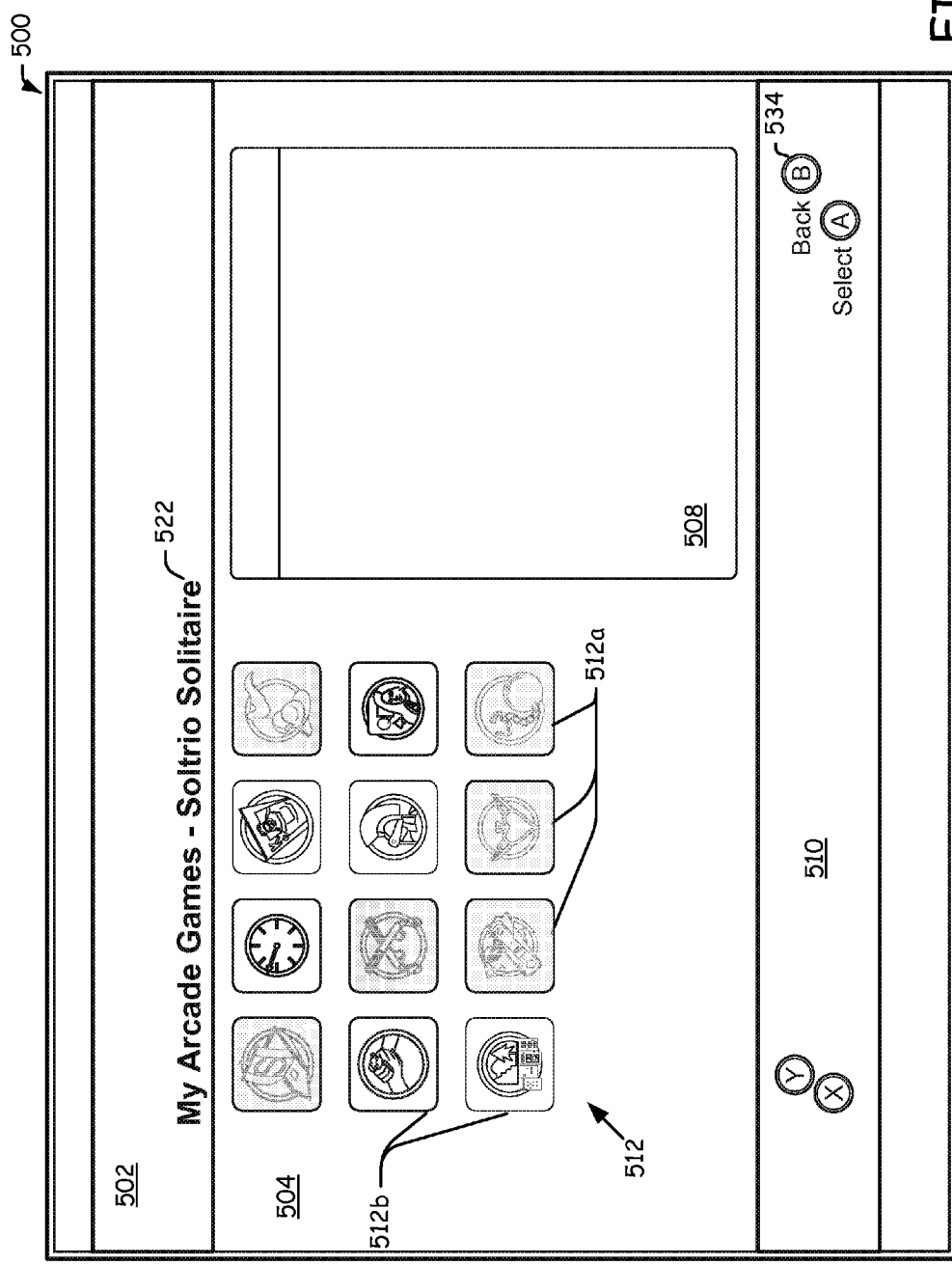
FIG. 5 is an exemplary user interface for providing achievement information.

Once a user selects the option for View Achievements, the user may be presented in step 410 with a GUI screen 500 as shown in FIG. 5. The GUI 500 includes a border area 502 including the name 522 of the game, an achievement listing area 504 including an iconic list of all achievements for the game, a descriptor area 508 for including descriptions of selected achievements, and a navigation area 510 including navigation buttons. In the example of FIG. 5, the arcade game displayed is "Soltrio Solitaire," and the achievements displayed on GUI 500 would therefore be tailored to that game. It is understood that each different game being played may have different achievements and descriptions which would be displayed on GUI 500 when GUI 500 was accessed during the game.

Achievement listing area 504 lists all of the achievements available for the current player game. When a user accesses the achievement GUI 500, the game application program retrieves all of the achievement information from memory, including the icons which represent the respective achievements and the accompanying descriptions for each achievement. This achievement information is created by the game developer. The icons 512 representing each retrieved achievement is displayed in achievement listing area 504 in step 410. In prior systems, a user needed to drill down through several different menu items and different display screens in order to retrieve and display all achievements for a game. The present system addresses this shortcoming by providing a single, comprehensive view in GUI 500 showing all of the achievements existing for a given game.

As seen in FIG. 5, some of the icons 512 are displayed with a degree of transparency (icons 512a), while others are displayed solidly or opaquely (icons 512b). The icons 512a having a degree of transparency are those achievements which remain locked, i.e., the user has not yet accomplished these achievements. The solid icons 512b are those achievements which the user has unlocked and completed. As explained below, the descriptions for a given icon 512 will differ depending on whether the user has accomplished an achievement or not.

Figure 6:
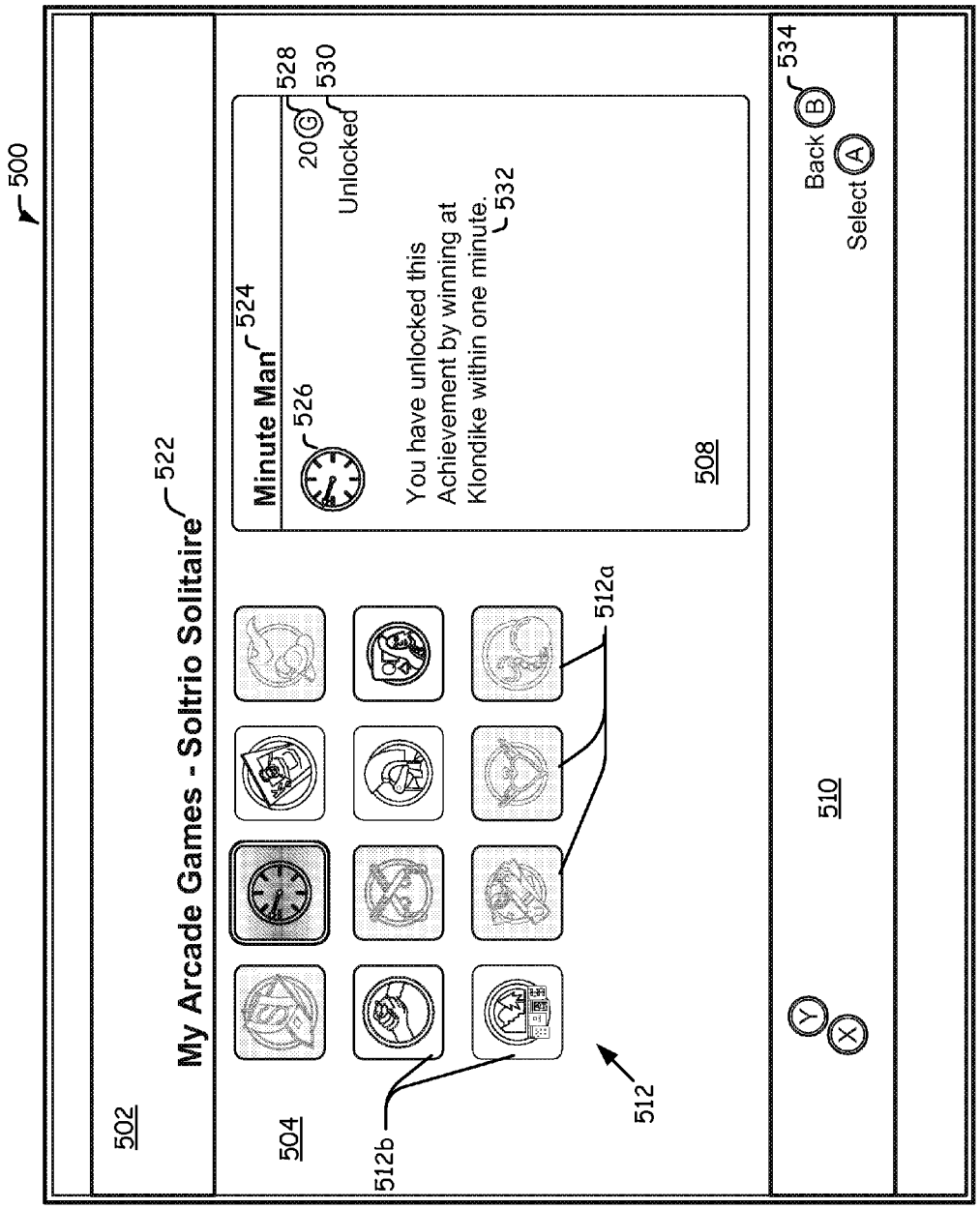
FIG. 6 is an exemplary user interface for providing achievement information for an unlocked achievement.

Referring now to step 412, a user may place focus on an icon 512 for example by using controller 104 of FIG. 1 in order to select it. As shown in FIG. 6, if a user places focus on a particular icon 512, then that icon may be highlighted, and the achievement and descriptive information for that achievement may be displayed in the descriptor area 508 of GUI 500. As indicated above, the description of an achievement will vary depending on whether a user has accomplished, or unlocked, an achievement. The data as to which achievements have been unlocked by a user were downloaded to cache in step 404. Accordingly, the game application program checks in step 418 whether the achievement for a selected icon is locked or unlocked. If an achievement has been unlocked, then the achievement and appropriate description for the unlocked achievement are provided in step 420 in descriptor area 508.

For example, as shown in FIG. 6, a user has selected the achievement called "Minute Man," by placing focus on the icon for that achievement. The descriptor area 508 includes the name 524 of the achievement, a picture (icon) 526 of the achievement, the points 528 (referred to as "gamerpoints" in embodiments) gained from unlocking the achievement and also a status 530 of the achievement as being either "locked" or "unlocked." As the user has accomplished the selected achievement in FIG. 6, the status of "unlocked" is provided. The descriptor area 508 further includes a description 532 of the achievement. In the embodiment shown in FIG. 6, the description included is, "You have unlocked this Achievement by winning at Klondike within one minute." However, it is understood that this description may vary in length and content, in general describing what the user has achieved with the achievement. In embodiments, the description preferably fits within the window provided for the descriptor area 508. However, it is contemplated that the size of the description may exceed the boundaries of the descriptor area, and graphical scroll bars may be provided.

Figure 7:
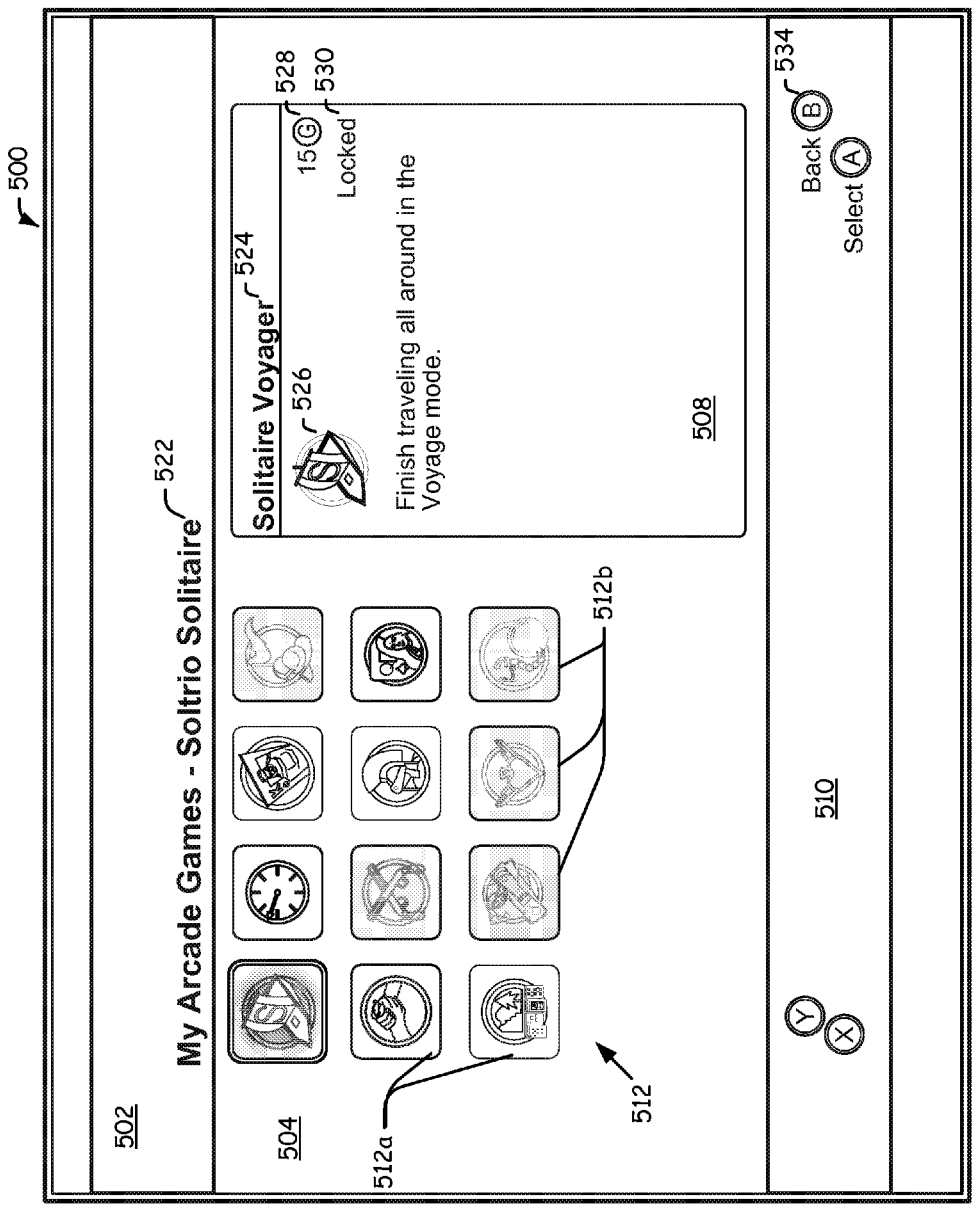
FIG. 7 is an exemplary user interface for providing achievement information for a locked achievement.

If the user places focus on an icon for an achievement that has not yet been accomplished, then the achievement and appropriate description for the locked achievement are provided in step 422 in descriptor area 508. For example, as shown in FIG. 7, a user has selected the achievement called "Solitaire Voyager," by placing focus on the icon for that achievement. The descriptor area 508 includes the name of the achievement, a picture (icon) of the achievement, the points to be gained from unlocking the achievement and also a status of the achievement as being either "locked" or "unlocked." As the user has not yet accomplished the selected achievement, the status of "locked" is provided, and the descriptor area 508 includes a description of what must be done to unlock the achievement. In the embodiment shown, the description included is, "Finish traveling all around in the Voyager mode." However, it is understood that this description may vary in length and content, in general providing a hint or describing what the user must do to unlock the achievement. In embodiments, the description preferably fits within the window provided for the descriptor area 508. However, it is contemplated that the size of the description may exceed the boundaries of the descriptor area, and graphical scroll bars be provided.

Thus, according to the present system, a user may see all achievements and receive a description of all achievements on a single, comprehensive screen. Such a user interface is not found in the prior art. Additionally, a user is provided information about all achievements, even those which have not yet been accomplished. A user may also quickly and easily discern from GUI 500 which achievements have been accomplished and which remain to be accomplished. Each of these features is again an improvement over prior art systems, which only showed achievements which have been accomplished.

A further advantage of GUI 500 is that it may be dynamically expandable. That is, as more achievements become available in a game, they may be added to GUI 500, along with an associated description.

Referring again to the flowchart of FIG. 4, at any time during the display of GUI 500, such as for example before a particular icon is selected, or after an icon is selected and the associated information displayed, a user may opt in step 414 to leave the achievements GUI 500 and return to playing the game in step 426. Those of skill in the art will appreciate a wide variety of schemes for closing GUI 500 and returning to the game, including for example a back button 534 in navigation area 510. Alternatively, a user may simply select a graphical tab on the GUI 500 which returns the user to the game playing mode.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of providing information relating to achievements within a game application program, the method comprising the steps of:
    (a) launching the game application program on a gaming and media system;
    (b) caching data relating to which achievements from the game application program have been accomplished, said step (b) of data caching performed prior to any display of achievements after launching the game in said step (a);
    (c) displaying on a single graphical screen of a display each achievement possible in the game application program;
    (d) receiving an indication of a particular achievement displayed on the graphical user interface in said step (a); and
    (e) displaying, on the single graphical screen of the display, at least one of:
        i. a description of the particular achievement indicated in said step (d);
        ii. the score associated with the particular achievement indicated in said step (d); and
        iii. the status of the particular achievement indicated in said step (d).

2. A method of claim 1, further comprising repeating steps (d) and (e) for other achievements displayed in said step (c).

3. A method of claim 1, wherein said step (c) of displaying each achievement possible in the game application program comprises the step of displaying an icon representing each achievement possible in the game application program.

4. A method as recited in claim 1, further comprising the step of providing an indication of which achievements displayed in said step (c) have been accomplished.

5. A method as recited in claim 4, wherein said indication comprises displaying achievements which have not been accomplished with a degree of transparency, and displaying achievements which have been accomplished opaquely.

6. A method as recited in claim 4, said step (e) further comprising displaying a first description if the indicated achievement has been accomplished and displaying a second description, different than the first description, if the indicated achievement has not been accomplished.

7. A method as recited in claim 4, said step (c) further comprising displaying a first description if the indicated achievement has been accomplished and displaying a second description, different than the first description, if the indicated achievement has not been accomplished.

8. A method as recited in claim 1, wherein the display of each achievement possible in the game application program is dynamically expandable.

9. A method as recited in claim 1, further comprising the step of downloading the game application program into the gaming and media system over a network connection.

10. A method as recited in claim 1, further comprising the step of loading the game application program into the gaming and media system from a portable memory media.

11. A method as recited in claim 1, further comprising a gaming mode where a user may play the game presented by the game application program, wherein the user may switch between the gaming mode and the performance of said step (a) of displaying each achievement possible in the game application program by a single interaction with the user interface selection device.

* * * * *